(12) United States Patent
Jayakumar et al.

(10) Patent No.: US 11,258,632 B2
(45) Date of Patent: Feb. 22, 2022

(54) UNAVAILABLE INTER-CHASSIS LINK STORAGE AREA NETWORK ACCESS SYSTEM

(71) Applicant: Dell Products L.P., Round Rock, TX (US)

(72) Inventors: Avinash Jayakumar, Chennai (IN); Vibin Varghese, Chennai (IN); Ramesh Kumar Subbiah, Chennai (IN)

(73) Assignee: Dell Products L.P., Round Rock, TX (US)

( * ) Notice: Subject to any disclaimer, the term of this patent is extended or adjusted under 35 U.S.C. 154(b) by 49 days.

(21) Appl. No.: 16/810,946

(22) Filed: Mar. 6, 2020

(65) Prior Publication Data

US 2021/0281441 A1    Sep. 9, 2021

(51) Int. Cl.
| | | |
|---|---|---|
| *H04L 12/40* | (2006.01) | |
| *H04L 29/08* | (2006.01) | |
| *H04L 12/709* | (2013.01) | |
| *H04L 12/703* | (2013.01) | |
| *H04L 12/911* | (2013.01) | |
| *H04L 12/801* | (2013.01) | |
| *H04L 67/1097* | (2022.01) | |
| *H04L 47/10* | (2022.01) | |
| *H04L 45/28* | (2022.01) | |
| *H04L 47/74* | (2022.01) | |
| *H04L 45/24* | (2022.01) | |

(52) U.S. Cl.
CPC ...... *H04L 12/40176* (2013.01); *H04L 45/245* (2013.01); *H04L 45/28* (2013.01); *H04L 47/13* (2013.01); *H04L 47/746* (2013.01); *H04L 67/1097* (2013.01)

(58) Field of Classification Search
CPC . H04L 12/40176; H04L 45/245; H04L 45/28; H04L 47/13; H04L 47/746; H04L 67/1097
USPC .......................................................... 370/222
See application file for complete search history.

(56) References Cited

U.S. PATENT DOCUMENTS

| | | | | |
|---|---|---|---|---|
| 8,724,456 | B1* | 5/2014 | Hong .................. | G06F 11/3055 370/225 |
| 8,730,963 | B1* | 5/2014 | Grosser, Jr. ........... | H04L 45/245 370/392 |
| 10,554,494 | B1* | 2/2020 | Thakor .................... | H04L 67/34 |
| 2006/0047850 | A1* | 3/2006 | Singh Bhasin ......... | H04L 69/40 709/238 |
| 2008/0181119 | A1* | 7/2008 | Beyers ................ | H04L 43/0823 370/241 |
| 2014/0204761 | A1* | 7/2014 | Durrani ................. | H04L 47/125 370/236 |
| 2018/0331977 | A1* | 11/2018 | Krishnasamy ...... | H04L 67/1097 |

\* cited by examiner

*Primary Examiner* — Candal Elpenord
(74) *Attorney, Agent, or Firm* — Joseph Mencher

(57) ABSTRACT

A Storage Area Network (SAN) access includes a first aggregated switch device that is coupled to a host device, a Local Area Network (LAN), and a SAN, and a second aggregated switch device that is coupled to the host device, the LAN, and the SAN. The second aggregated switch device is connected to the first aggregated switch device via an Inter-Chassis Link (ICL). The second aggregated switch device detect that the ICL has become unavailable and, in response, prevents Internet Protocol traffic between the host device and the LAN while transmitting storage traffic between the host device and the SAN.

20 Claims, 11 Drawing Sheets

UNAVAILABLE INTER-CHASSIS LINK STORAGE AREA NETWORK ACCESS SYSTEM

BACKGROUND

The present disclosure relates generally to information handling systems, and more particularly to providing access for host devices to a Storage Area Network (SAN) in the event of link failures associated with aggregated networking information handling systems that couple those host devices to that SAN.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and/or other networking devices known in the art, are sometimes aggregated together in order to, for example, provide a single logical networking device that includes the capabilities of the aggregated physical networking devices and/or provide other advantages known in the art. For example, Virtual Link Trunking (VLT) switch devices utilize the VLT protocol (a proprietary aggregation protocol provided in switch devices available from DELL® Inc. of Round Rock, Tex., United States) in order to provide a redundant, load-balancing connection to a core network in a loop-free environment while eliminating the need to utilize the Spanning Tree Protocol. In a specific example, a primary VLT switch device (also called a primary VLT "peer" device or "node") may be coupled to a secondary VLT switch device via an Inter-Chassis Link (ICL) (also referred to as a VLT interconnect (VLTi)) to provide a VLT domain that couples host devices (e.g., server devices) to both a Local Area Network (LAN) and a Storage Area Network (SAN).

In such a configuration, each of the host devices may be coupled to both of the primary and secondary VLT switch devices by a respective Link Aggregation Group (LAG) (also referred to as a VLT port channel). Furthermore, both of the primary and secondary VLT switch devices may be coupled via a LAG (also referred to as a VLT port channel) to an Ethernet switch device that provides access to the LAN, with the primary VLT switch device coupled via a link to a first N_Port Identifier Virtualization (NPIV) Proxy Gateway (NPG) switch device that provides access to the SAN (e.g., a "primary" portion of the SAN), and the secondary VLT switch device coupled via a link to a second NPG switch device that provides access to the SAN (e.g., a "secondary" or "redundant" portion of the SAN.) However, in such configurations, link failures associated with the VLT switch devices can inhibit and/or prevent access by the host devices to the SAN, even in cases where a path between the host devices and the SAN exists.

For example, in the event of a failure of the ICL between the primary and secondary VLT switch devices, the VLT protocol provides for the "bringing down" of the links in the VLT port channels that are provided by the secondary VLT switch device in order to prevent duplicate Internet Protocol traffic via the VLT domain (which is typically prevented using communications between the primary and secondary VLT switch device via the ICL.) As such, continuing with the example above, in the event of the failure of the ICL/VLTi, the links in the VLT port channels between the secondary VLT switch device and both of the host devices would become unavailable, and the link in the VLT port channel between the secondary VLT switch device and the Ethernet switch device would become unavailable. As such, the access for the host devices via the secondary VLT switch device to the SAN (e.g., the "secondary" or "redundant" portion of the SAN) will be unavailable (due to the unavailability of the links in the VLT port channels between the secondary VLT switch device and both of the host devices), limiting the host devices to accessing the SAN (e.g., the "primary" portion of the SAN) via the primary VLT switch device, and reducing storage traffic throughput via the aggregated switch/VLT domain. Furthermore, in the event that the link between the primary VLT switch device and the first NPG switch device becomes unavailable while the ICL is unavailable, no path will be available between the host devices and the SAN (even when Multi-Path Input/Output (MPIO) support is provided), despite the fact that the link between the secondary VLT switch device and the second NPG device (that provides access to the SAN) is still available.

Accordingly, it would be desirable to provide SAN access system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Storage Area Network (SAN) access engine that is configured to: detect that an Inter-Chassis Link (ICL) to an aggregated switch device has become unavailable; prevent, in response to detecting the ICL to the aggregated switch device has become unavailable, Internet Protocol traffic between a host device and a Local Area Network (LAN); and transmit, in response to detecting the ICL to the aggregated switch device has become unavailable, storage traffic between the host device and a Storage Area Network (SAN).

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
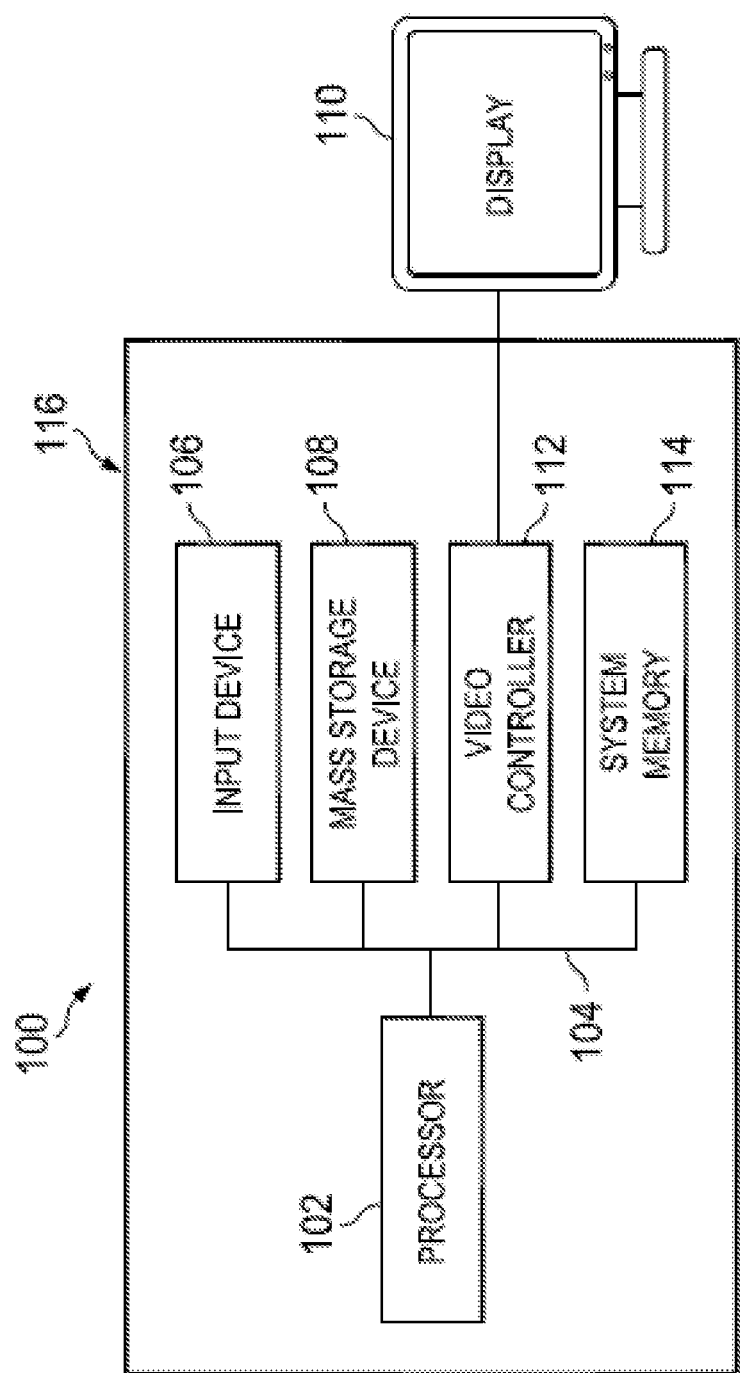
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
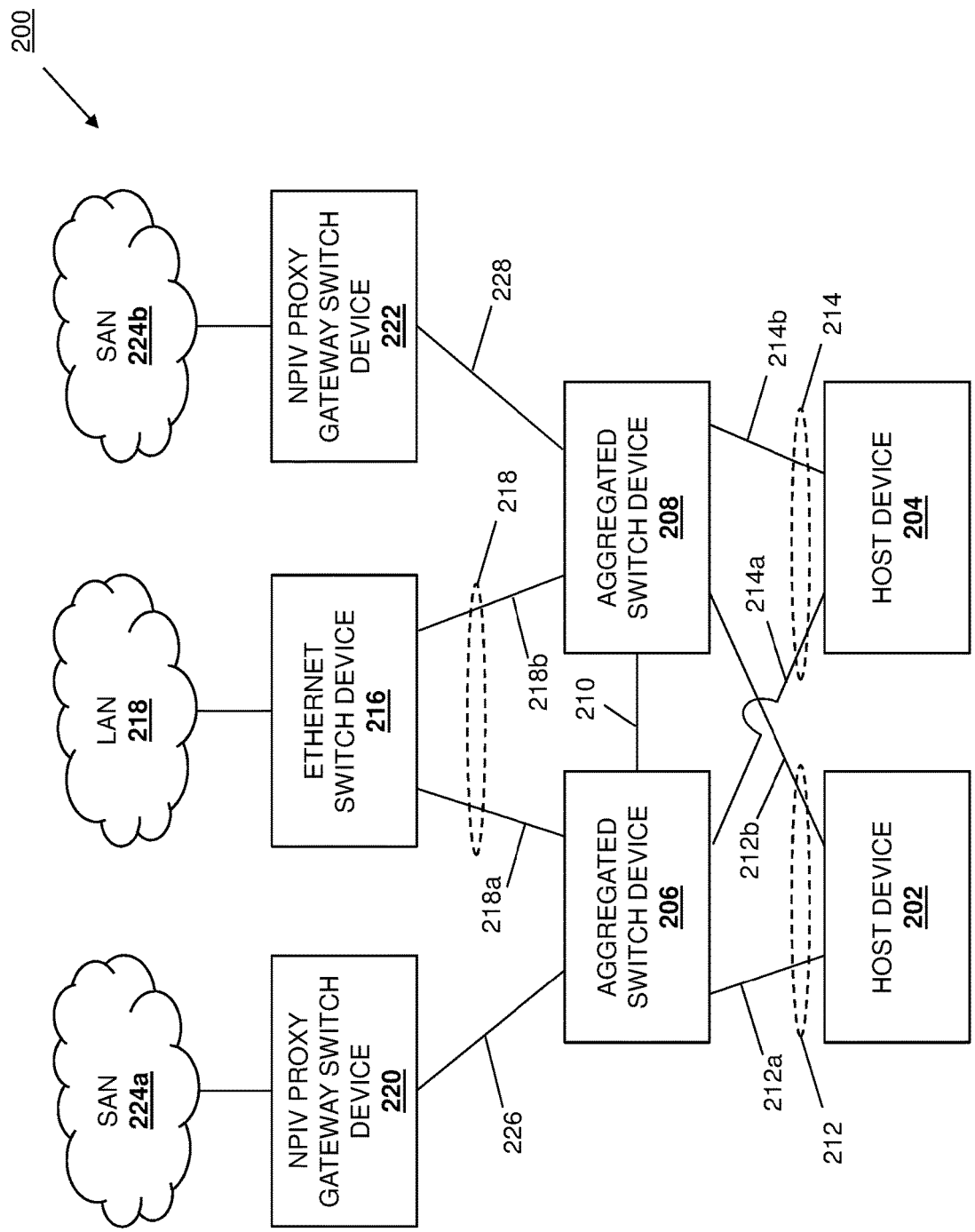
FIG. 2 is a schematic view illustrating an embodiment of a SAN access system.

Referring now to FIG. 2, an embodiment of a SAN access system 200 is illustrated. The SAN access system 200 may include a plurality of host devices such as the host devices 202 and 204 illustrated in FIG. 2. In an embodiment, the host devices 202 and 204 may be provided by the IHS 100 discussed above with reference to FIG. 1, and/or may include some or all of the components of the IHS 100, and in specific examples may be provided by server computing devices. However, while illustrated and discussed as being provided by server computing devices, one of skill in the art in possession of the present disclosure will recognize that host device provided in the SAN access system 200 may include any devices that may be configured to operate similarly as the host devices 202 and 204 discussed below. Furthermore, while only two host devices are illustrated and described below, one of skill in the art in possession of the present disclosure will recognize that the SAN access system of the present disclosure may (and typically will) include many more host devices while remaining within the scope of the present disclosure.

In the illustrated embodiment, the SAN access system 200 also includes a pair of aggregated switch devices 206 and 208. In an embodiment, the aggregated switch devices 206 and 208 may be provided by the IHS 100 discussed above with reference to FIG. 1, and/or may include some or all of the components of the IHS 100, and in specific examples may be provided by VLT switch devices that utilize the VLT protocol (a proprietary aggregation protocol provided in switch devices available from DELL® Inc. of Round Rock, Tex., United States) in order to provide a redundant, load-balancing connection to a core network in a loop-free environment while eliminating the need to utilize the Spanning Tree Protocol. However, while illustrated and discussed as being provided by VLT switch devices, one of skill in the art in possession of the present disclosure will recognize that aggregated switch devices provided in the SAN access system 200 may include any devices that may be configured to operate similarly as the aggregated switch devices 206 and 208 discussed below. While not illustrated, one of skill in the art in possession of the present disclosure will appreciate that the aggregated switch devices 206 and 208 may be coupled to an aggregated switch device management system that operates to manage the aggregated switch devices 206 and 208 in some embodiments (e.g., management systems provided with VLT switch devices using SMARTFABRIC® services available from DELL® Inc. of Round Rock, Tex., United States), although aggregated switch devices that operate without a separate management system will fall within the scope of the present disclosure as well.

In the illustrated embodiment, the aggregated switch devices 206 and 208 are coupled together by an Inter-Chassis Link (ICL) 210, which one of skill in the art in possession of the present disclosure will appreciate may include one or more links (e.g., provided by Ethernet cable(s) connected between respective ports on the aggregated switch devices 206 and 208), in order to provide an aggregated switch domain including the primary aggregated switch device 206 and the secondary aggregated switch device 208 discussed below. Continuing the example in which the aggregated switch devices 206 and 208 are VLT switch devices, the primary VLT switch device 206 may be coupled to the secondary VLT switch device 206 by a VLTi 210 in order to provide a VLT domain. As illustrated, each of the host devices 202 and 204 are coupled to the aggregated switch device domain, with the host device 202 coupled to the aggregated switch devices 206 and 208 by a Link Aggregation Group (LAG) 212 that includes a link 212a to the aggregated switch device 206 and a link 212b to the aggregated switch device 208, and the host device 204 coupled to the aggregated switch devices 206 and 208 by a Link Aggregation Group (LAG) 214 that includes a link 214a to the aggregated switch device 206 and a link 214b to the aggregated switch device 208. Continuing the example in which the aggregated switch devices 206 and 208 are VLT switch devices, the host device 202 may be coupled to the primary and secondary VLT switch devices 206 and 208 by a VLT port channel 212, and the host device 204 may be coupled to the primary and secondary VLT switch devices 206 and 208 by a VLT port channel 214.

In the illustrated embodiment, the SAN access system 200 also includes an Ethernet switch device 216 that is coupled to a Local Area Network (LAN) 218 and that is configured to transmit Internet Protocol (IP) traffic via the LAN 218 to computing devices coupled to that LAN 218. As illustrated in FIG. 2, the Ethernet switch device 216 is coupled to the aggregated switch devices 206 and 208 by a Link Aggregation Group (LAG) 218 that includes a link 218a to the aggregated switch device 206 and a link 218b to the aggregated switch device 208. Continuing the example in which the aggregated switch devices 206 and 208 are VLT switch devices, the Ethernet switch device 216 may be coupled to the primary and secondary VLT switch devices 206 and 208 by a VLT port channel 216. In the illustrated embodiment, the SAN access system 200 also includes an N_Port Identifier Virtualization (NPIV) Proxy Gateway (NPG) switch device 220 and an NPG switch device 222 that are coupled to a Storage Area Network (SAN), with the NPG switch device 220 coupled to a "primary" SAN 224a and the NPG switch device 222 coupled to a "secondary"/"redundant" SAN 224b, and with each of the NPG switch devices 220 and 222 configured to transmit storage traffic (e.g., Fibre Channel (FC) traffic, FC over Ethernet (FCoE) traffic, etc.) via the SAN to storage devices coupled to that SAN. As will be appreciated by one of skill in the art in possession of the present disclosure, the primary SAN 224a and the secondary SAN 224b may couple to the same storage devices, thus providing primary and secondary network paths (e.g., "redundant paths") to the storage devices utilized by the SAN access system 200. As illustrated in FIG. 2, the NPG switch device 220 is coupled to the aggregated switch device 206 by a link 226, and the NPG switch device 222 is coupled to the aggregated switch device 208 by a link 228. However, while a specific SAN access system 200 has been illustrated and described, one of skill in the art in possession of the present disclosure will recognize that the SAN access system of the present disclosure may include a variety of components and component configurations while remaining within the scope of the present disclosure as well.

Figure 3:
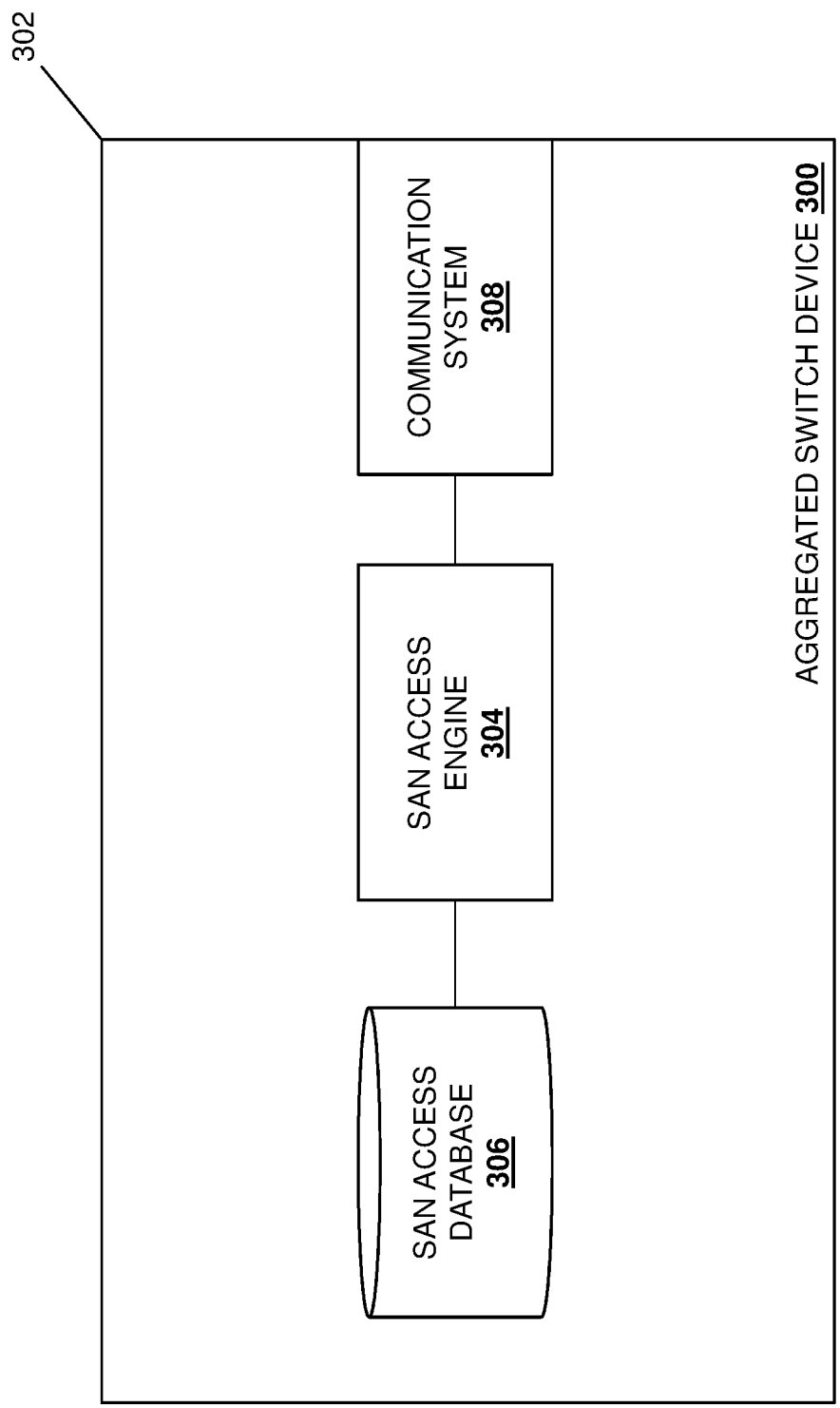
FIG. 3 is a schematic view illustrating an embodiment of an aggregated networking device that may be provided in the SAN access system of FIG. 2.

Referring now to FIG. 3, an embodiment of an aggregated switch device 300 is illustrated that may provide either or both of the aggregated switch devices 206 and 208 discussed above with reference to FIG. 2. As such, the aggregated switch device 300 may be provided by the IHS 100 discussed above with reference to FIG. 1 and/or may include some or all of the components of the IHS 100, and in specific examples may be provided by a VLT switch device. Furthermore, while illustrated and discussed as being provided by a VLT switch device, one of skill in the art in possession of the present disclosure will recognize that the functionality of the aggregated switch device 300 discussed below may be provided by other devices that are configured to operate similarly as the aggregated switch device 300 discussed below. In the illustrated embodiment, the aggregated switch device 300 includes a chassis 302 that houses the components of the aggregated switch device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a SAN access engine 304 that is configured to perform the functionality of the SAN access engines and/or aggregated switch devices discussed below.

The chassis 302 may also house a storage system (not illustrated, but which may include the storage 108 discussed above with reference to FIG. 1) that is coupled to the SAN access engine 304 (e.g., via a coupling between the storage system and the processing system) and that includes a SAN access database 306 that is configured to store any of the information utilized by the SAN access engine 304 discussed below. The chassis 302 may also house a communication system 308 that is coupled to the SAN access engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As such, the communication system 308 may include ports and/or other subsystems for providing any links with the other devices in the SAN access system 200 as discussed herein. However, while a specific aggregated switch device 300 has been illustrated, one of skill in the art in possession of the present disclosure will recognize that aggregated switch devices (or other devices operating according to the teachings of the present disclosure in a manner similar to that described below for the aggregated switch device 300) may include a variety of components and/or component configurations for providing conventional aggregated switch device functionality, as well as the functionality discussed below, while remaining within the scope of the present disclosure as well.

Figure 4:
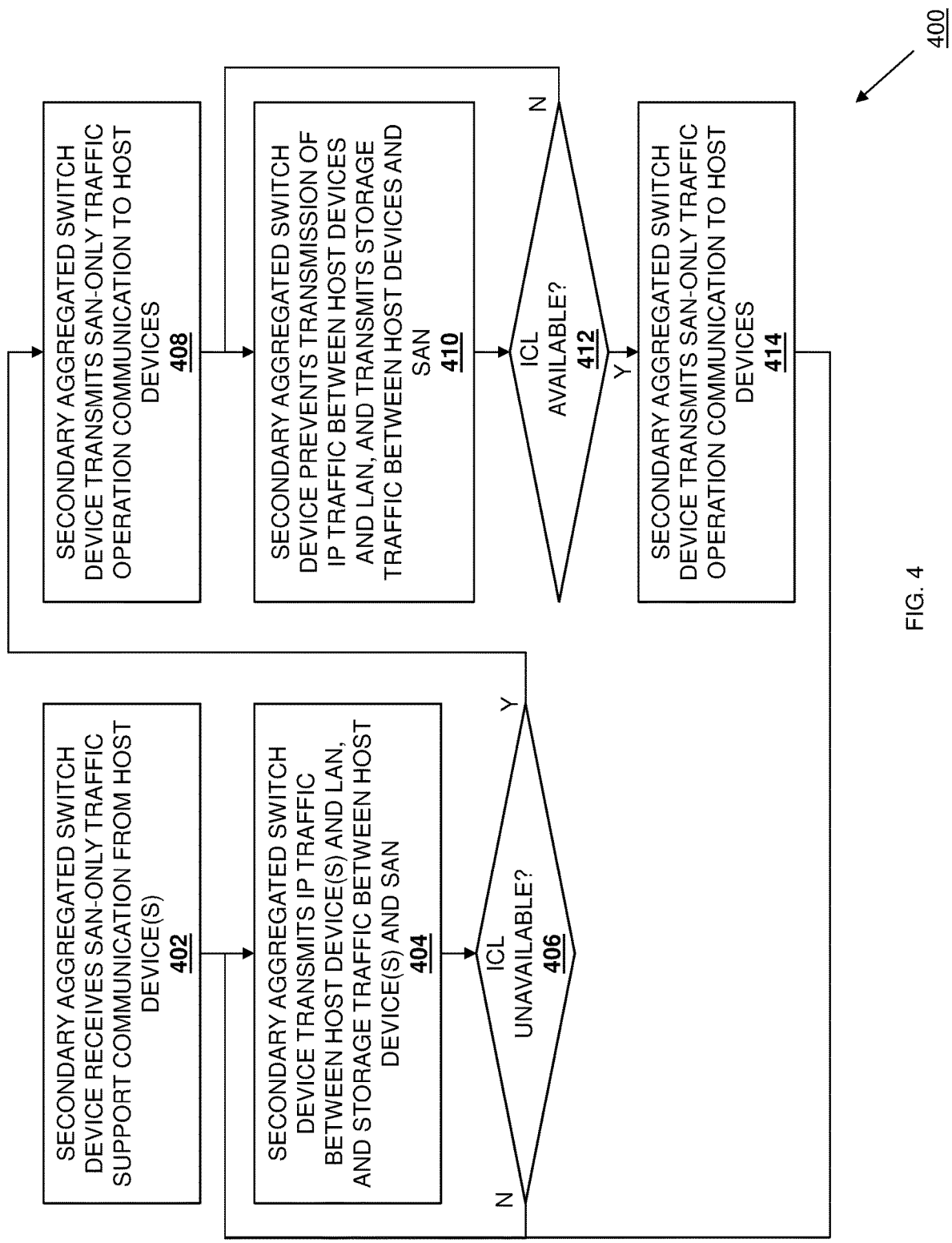
FIG. 4 is a flow chart illustrating an embodiment of a method for accessing a SAN.

Referring now to FIG. 4, an embodiment of a method 400 for providing access to the SAN is illustrated. As discussed below, the systems and methods of the present disclosure provide for the transmission of storage traffic to a SAN via a secondary aggregated switch device in the event that an ICL with a primary aggregated switch device become unavailable. As discussed above, in the event the ICL between the primary aggregated switch device and the secondary aggregated switch device becomes unavailable, conventional aggregated switch device operation operates to "bring down" or otherwise make unavailable links from the secondary aggregated switch device that are included in a LAG with links from the primary aggregated switch device in order to, for example, prevent the transmission of duplicate traffic. The systems and methods of the present disclosure modify such conventional operations by still preventing the transmission of IP traffic via the links from the secondary aggregated switch device that are included in a LAG with links from the primary aggregated switch device in the event the ICL becomes unavailable, while providing for the transmission of storage traffic over those links. As such, access for host devices to the SAN via the secondary aggregated switch device does not become unavailable in the event the ICL becomes unavailable, increasing storage traffic throughput in ICL-unavailable situations, and access for host devices to the SAN is not completely cut off when both the ICL and the link from the primary aggregated switch device to the SAN become unavailable.

Figure 5:
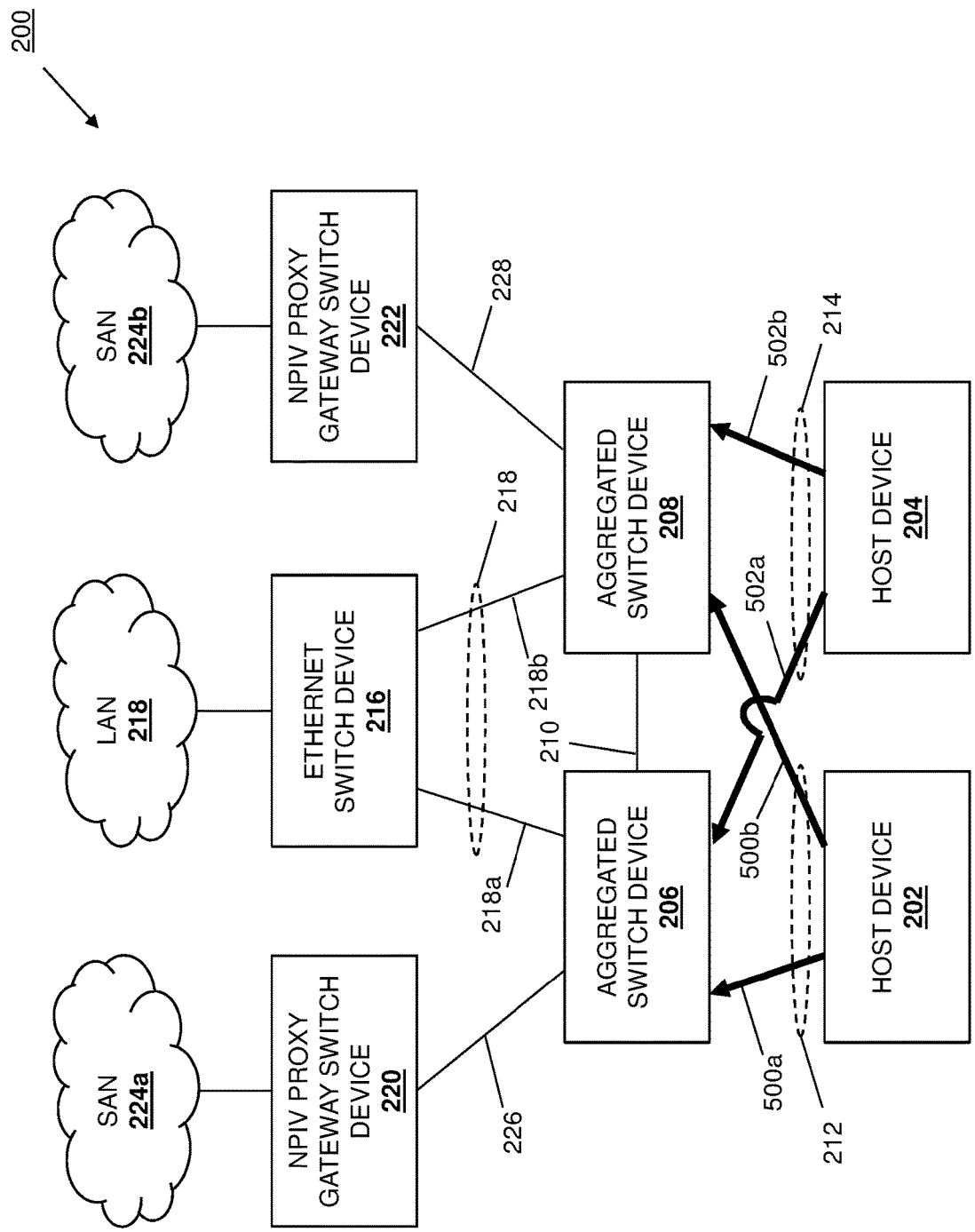
FIG. 5 is a schematic view illustrating an embodiment of the SAN access system of FIG. 2 operating during the method of FIG. 4.

The method 400 begins at block 402 where a secondary aggregated switch device receives a SAN-only traffic support communication from host device(s). In an embodiment, at block 402, the host devices 202 and 204 may operate at block 402 to generate and transmit SAN-only traffic support communications to the aggregated switch devices 206 and 208 following, for example, connection of the host devices 202 and 204 to the aggregated switch devices 206 and 208 and initialization of the host devices 202 and 204 and the aggregated switch devices 206 and 208 (and/or in any other situation that would be apparent to one of skill in the art in possession of the present disclosure.) For example, FIG. 5 illustrates how the host device 202 may transmit SAN-only traffic support communications 500a and 500b via the links 212a and 212b in the LAG 212 to each of the aggregated switch devices 206 and 208, and the host device 204 may transmit SAN-only traffic support communications 502a and 502b via the links 214a and 214b in the LAG 214 to each of the aggregated switch devices 206 and 208. However, while both of the host devices 202 and 204 are illustrated and described as each transmitting SAN-only traffic support communications to each of the aggregated switch devices 206 and 208 (which provides benefits with regard to the switching of "primary" and "secondary" duties by the aggregated switch devices 206 and 208), one of skill in the art in possession of the present disclosure will appreciate that the host devices 202 and 204 may each transmit SAN-only traffic support communications to only one of the aggregated switch devices 206 and 208 (e.g., the secondary aggregated switch device 208 in the examples below) while remaining within the scope of the present disclosure as well.

As discussed below, the SAN-only traffic support communications generated and transmitted by the host devices at block 402 may be configured to indicate to the aggregated switch devices 206 and 208 that the host devices 202 and 204 support the SAN access functionality of the present disclosure. As such, one of skill in the art in possession of the present disclosure will appreciate that host devices that are coupled to the aggregated switch devices 206 and 208 and that do not support the SAN access functionality of the present disclosure may not generate and transmit the SAN-only traffic support communications discussed above at block 402. In a specific example, the SAN-only traffic support communications generated and transmitted by the host devices at block 402 may be provided in Type-Length-Value (TLV) data structures. For example, the SAN-only traffic support communications generated and transmitted by the host devices at block 402 may be provided using a Data Center Bridging exchange (DCBx) TLV data structure developed by the inventors of the present disclosure, an example of which is provided below:

| TLV TYPE = 127 | TLV INFORMATION LENGTH = 6 | 802.1 OUI 00-80-C2 | 802.1 SUBTYPE = XX | WILLING (1 BIT) | RESERVED (7 BITS) | SAN-ONLY TRAFFIC SUPPORT FLAG (1 BIT) | USE LINK FOR SAN-ONLY FLAG (1 BIT) | RESERVED (6 BITS) |
|---|---|---|---|---|---|---|---|---|

As will be appreciated by one of skill in the art in possession of the present disclosure, the SAN-only traffic support communications generated and transmitted by the host devices at block 402 may be configured to indicate to the aggregated switch devices 206 and 208 that the host devices 202 and 204 support the SAN access functionality of the present disclosure by, for example, setting the "SAN-ONLY TRAFFIC SUPPORT FLAG" in the DCBx TLV data structure above. However, while a specific example of a SAN-only traffic support communication has been described, one of skill in the art in possession of the present disclosure will appreciate that the SAN-only traffic support communications of the present disclosure may be provided in a variety of manners that will fall within the scope of the present disclosure as well.

As such, at block 402, the SAN access engine 304 in the aggregated switch device 206/300 may receive the SAN-only traffic support communications 500a and 500b via its communication system 308, and the SAN access engine 304 in the aggregated switch device 208/300 may receive the SAN-only traffic support communications 502a and 502b via its communication system 308. In an embodiment, in response to receiving the SAN-only traffic support communications 500a and 500b, the SAN access engine 304 in each of the aggregated switch devices 206/300 and 208/300 may store SAN-only traffic support identifiers for each of the host devices 202 and 204 in their SAN access database 306, which as discussed below may operate to indicate that the host devices 202 and 204 support (e.g., are configured to perform) the SAN access functionality of the present disclosure.

The method 400 then proceeds to block 404 where the secondary aggregated switch device transmits IP traffic between the host device(s) and a LAN, and storage traffic between the host device(s) and a SAN. As will be appreciate by one of skill in the art in possession of the present disclosure, in the examples below, the aggregated switch device 206 operates as a primary aggregated switch device in the aggregated switch domain (e.g., primary VLT switch device in the VLT domain), and the aggregated switch devices 208 operates as a secondary aggregated switch device in the aggregated switch domain (e.g., a secondary VLT switch device in the VLT domain). However, one of skill in the art in possession of the present disclosure will also appreciate that "primary" and "secondary" roles for aggregated switch devices in an aggregated switch domain may switch (e.g., due to unavailability of the current primary aggregated switch device) while remaining within the scope of the present disclosure as well, as thus the secondary aggregated switch device functionality performed by the aggregated switch device 208 in the examples below may be performed by the aggregated switch device 206 in other embodiments while remaining within the scope of the present disclosure.

In an embodiment, at block 404 the primary aggregated switch device 206 and the secondary aggregated switch device 208 may operate to transmit IP traffic and storage traffic between each of the host devices 202 and 204 and the LAN 218 and SAN 224a/224b. For example, at block 404, IP traffic transmitted by the host device 202 may be transmitted to the primary aggregated switch device 206 and/or the secondary aggregated switch device 208 via the links 212a and/or 212b in the LAG 212, and one of skill in the art in possession of the present disclosure will recognize that the primary aggregated switch device 206 and/or the secondary aggregated switch device 208 may operate to forward that IP traffic via their respective links 218a and 218b in the LAG 218 to the Ethernet switch device 216, while the Ethernet switch device 216 may operate to forward that IP traffic to the LAN 218. Similarly, at block 404 storage traffic (e.g., FC traffic, FCoE traffic, etc.) transmitted by the host device 202 may be transmitted to the primary aggregated switch device 206 and/or the secondary aggregated switch device 208 via the links 212a and/or 212b in the LAG 212, and one of skill in the art in possession of the present disclosure will recognize that the primary aggregated switch device 206 and/or the secondary aggregated switch device 208 may operate to forward that storage traffic via their respective links 226 and 228 to the NPG switch devices 220 and 222, respectively, while the NPG switch devices 220 and 222 may operate to forward that storage traffic to the SANs 224a and 224b, respectively.

Similarly as well, at block 404, IP traffic transmitted by the host device 204 may be transmitted to the primary aggregated switch device 206 and/or the secondary aggregated switch device 208 via the links 214a and/or 214b in the LAG 214, and one of skill in the art in possession of the present disclosure will recognize that the primary aggregated switch device 206 and/or the secondary aggregated switch device 208 may operate to forward that IP traffic via their respective links 218a and 218b in the LAG 218 to the Ethernet switch device 216, while the Ethernet switch device 216 may operate to forward that IP traffic to the LAN 218. Similarly, at block 404, storage traffic (e.g., FC traffic, FCoE traffic, etc.) transmitted by the host device 204 may be transmitted to the primary aggregated switch device 206 and/or the secondary aggregated switch device 208 via the links 214a and/or 214b in the LAG 214, and one of skill in the art in possession of the present disclosure will recognize that the primary aggregated switch device 206 and/or the secondary aggregated switch device 208 may operate to forward that storage traffic via their respective links 226 and 228 to the NPG switch devices 220 and 222, respectively, while the NPG switch devices 220 and 222 may operate to forward that storage traffic to the SANs 224a and 224b, respectively.

Figure 6A:
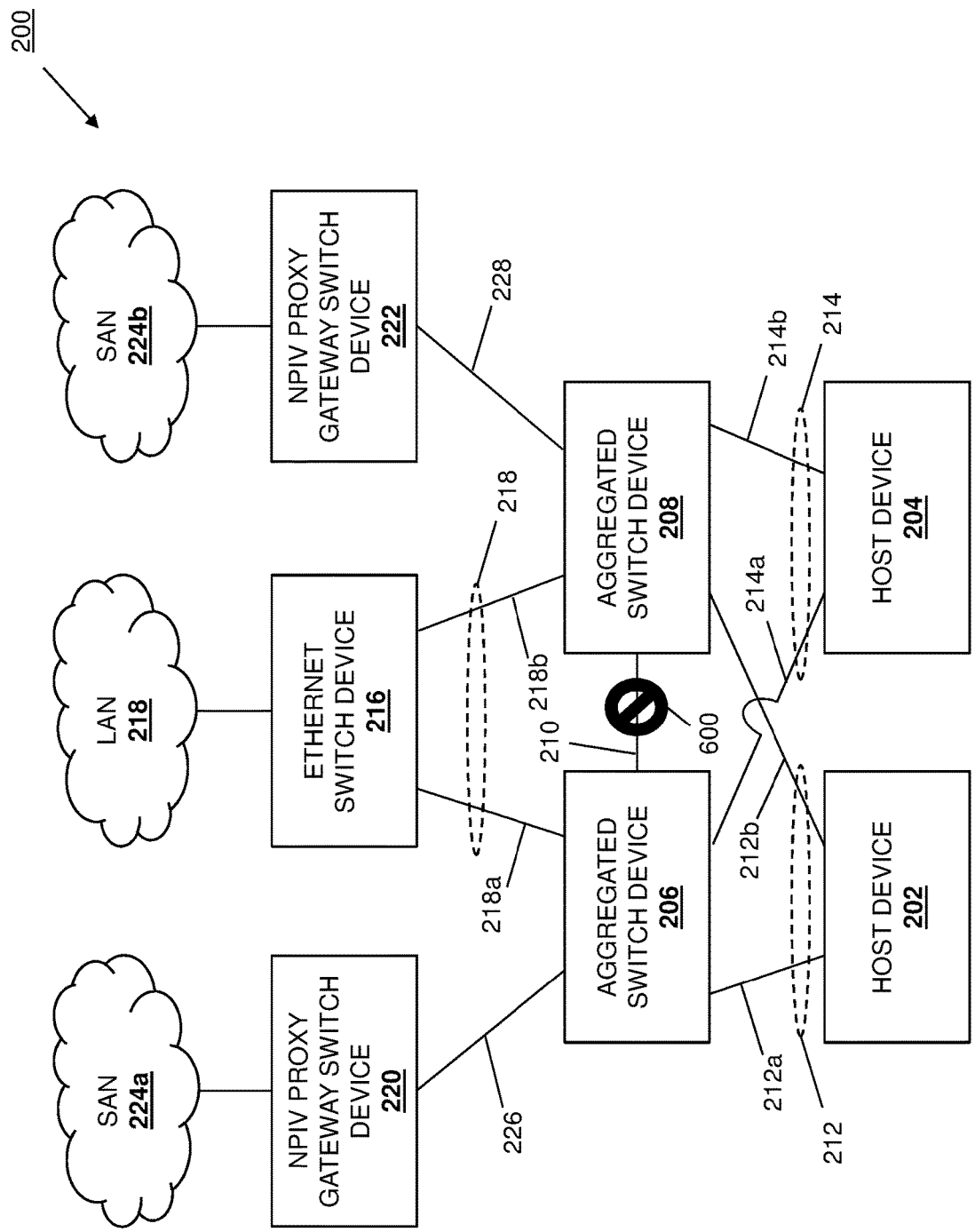
FIG. 6A is a schematic view illustrating an embodiment of the SAN access system of FIG. 2 operating during the method of FIG. 4.

The method 400 then proceeds to decision block 406 where it is determined whether an ICL between the secondary aggregated switch device and a primary aggregated switch device is unavailable. In an embodiment, at decision block 406, the SAN access engine 304 in the secondary aggregated switch device 208/300 may operate to determine whether the ICL 210 between the primary aggregated switch device and the secondary aggregated switch device 208 has become unavailable. As will be appreciated by one of skill in the art in possession of the present disclosure, ICLs provided between aggregated switch devices may fail, be "brought down", and/or otherwise may become unavailable due to a variety of issues, and FIG. 6A illustrates a situation in which the ICL 210 has become unavailable, as indicated by element 600 in FIG. 6A. Furthermore, one of skill in the art in possession of the present disclosure will appreciate how the SAN access engine 304 in the secondary aggregated switch device 208/300 may perform a variety of communications and/or other operations to monitor the ICL 210 for its availability in order to detect whether the ICL 210 has become unavailable.

If, at decision block 406, it is determined that the ICL between the secondary aggregated switch device and the primary aggregated switch device is available, the method 400 returns to block 404. As such the method 400 may loop such that the secondary aggregated switch device transmits both IP traffic and storage traffic while monitoring the availability of the ICL 210 as long as the ICL 210 remains available. If at decision block 406, it is determined that the ICL between the secondary aggregated switch device and the primary aggregated switch device is unavailable, the method 400 proceeds to block 408 where the secondary aggregated switch device transmits a SAN-only traffic operation communication to the host device(s). As discussed above, in response to the unavailability of an ICL between aggregated switch devices, conventional aggregated switch domain operation provides for the "bringing down" of the links in the LAGs to the secondary aggregated switch device in order to prevent the transmission of duplicate IP traffic (e.g., conventional VLT protocol operation provides for the "bringing down" of the links in the VLT port channels to the secondary VLT switch device in the event the VLTi between the primary VLT switch device and the secondary VLT switch device becomes unavailable.)

Figure 6B:
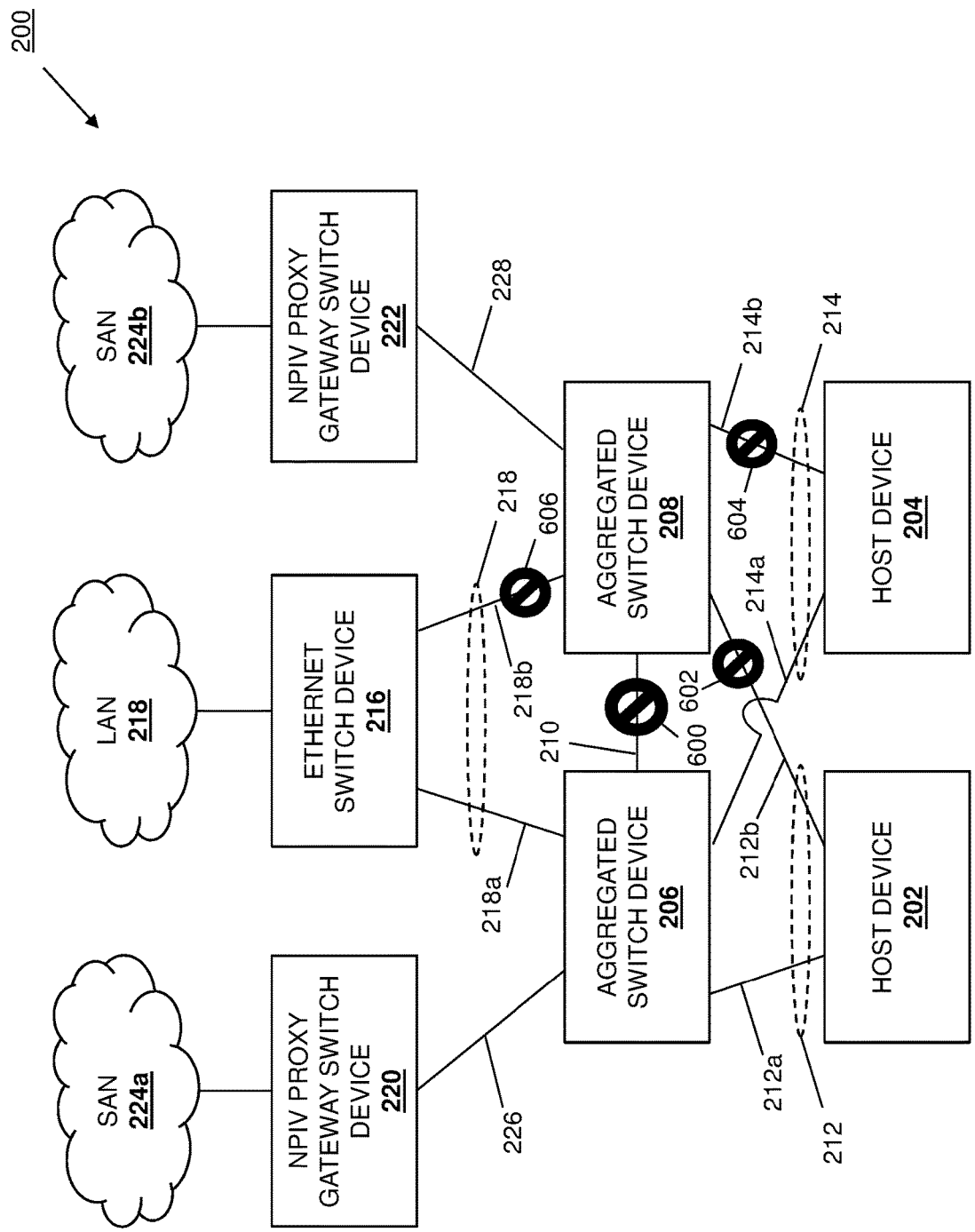
FIG. 6B is a schematic view illustrating an embodiment of the SAN access system of FIG. 2 operating during the method of FIG. 4.
Figure 6C:
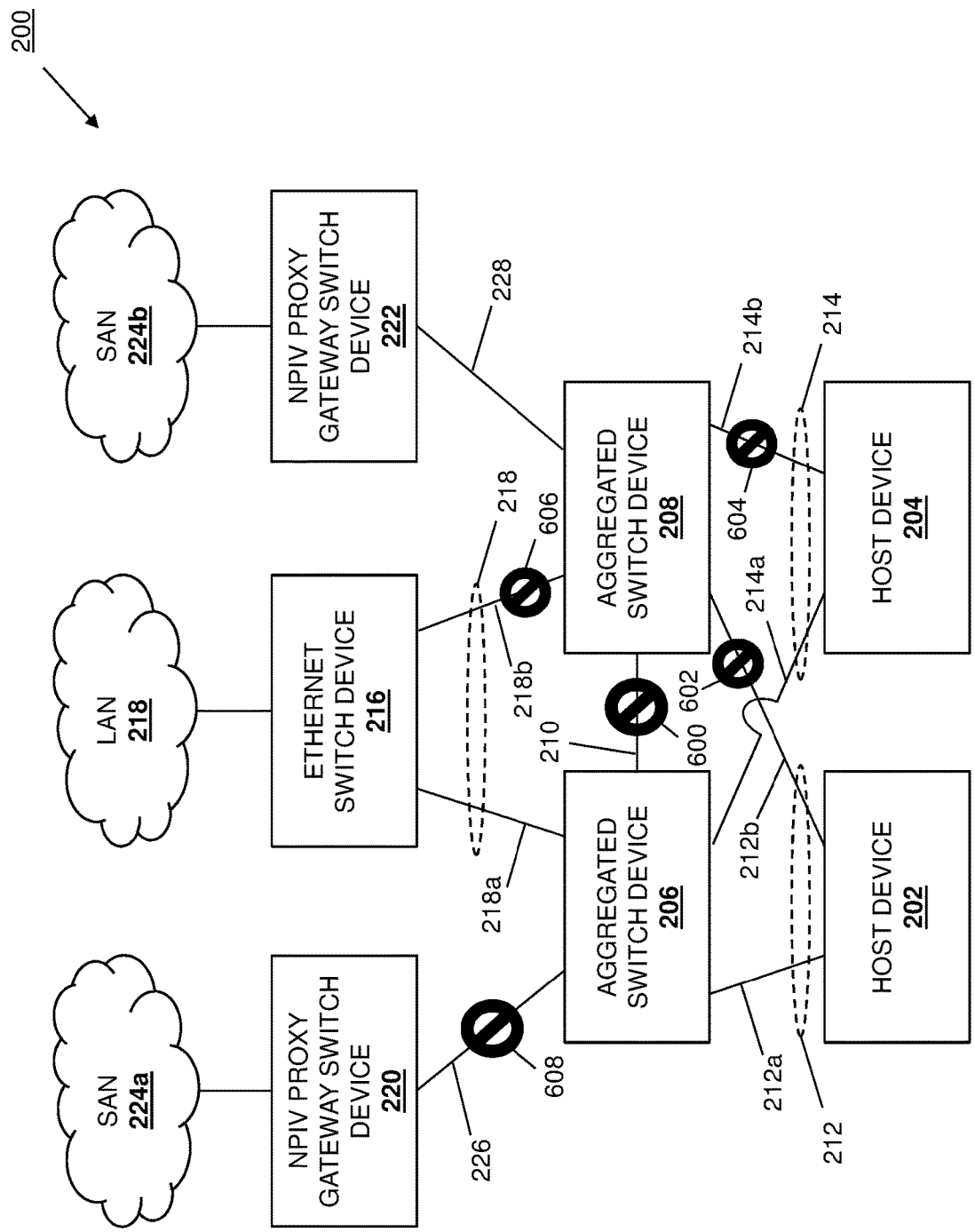
FIG. 6C is a schematic view illustrating an embodiment of the SAN access system of FIG. 2 operating during the method of FIG. 4.

As such, FIG. 6B illustrates how the unavailability of the ICL 210 (as indicated by element 600) may result in the unavailability of link 212b in the LAG 212 (as indicated by element 602), the unavailability of the link 214b in the LAG 214 (as indicated by element 604), and the unavailability of the link 218b in the LAG 218 (as indicated by element 606). In other words, each of the links 212b, 214b, and 218b in the LAGs 212, 214, and 216, respectively, to the secondary aggregated switch device 208 have been "brought down" such that they are unavailable in response to the unavailability of the ICL 210. As will be appreciated by one of skill in the art in possession of the present disclosure and as discussed above, such conventional operations limit access to the SAN on a path provided by the primary aggregated switch device 206 via the link 226 and the NPG switch device 220 to the SAN 224a, thus reducing the storage traffic throughput in the SAN access system 200. Furthermore, FIG. 6C illustrates how, in some embodiments, the link 226 between the primary aggregated switch device 206 and the NPG switch device 220 may become unavailable (e.g., in a "double-failure" situation involving the link 226 and the ICL 210), as indicated by element 608. As will be appreciated by one of skill in the art in possession of the present disclosure and as discussed above, the failure of the link 226 between the primary aggregated switch device 206 and the SAN 224a when conventional unavailable-ICL-operations are performed operates to cut off all access for the host devices 202 and 204 to the SAN. However, as discussed below, the SAN access functionality of the present disclosure provides for the transmission of storage traffic from either of the host devices 202 and 204 by the secondary aggregated switch device 208 via the available link 228 to the NPG switch device 222 such that that storage traffic may reach the SAN 224b in either of the situations discussed above.

Figure 7:
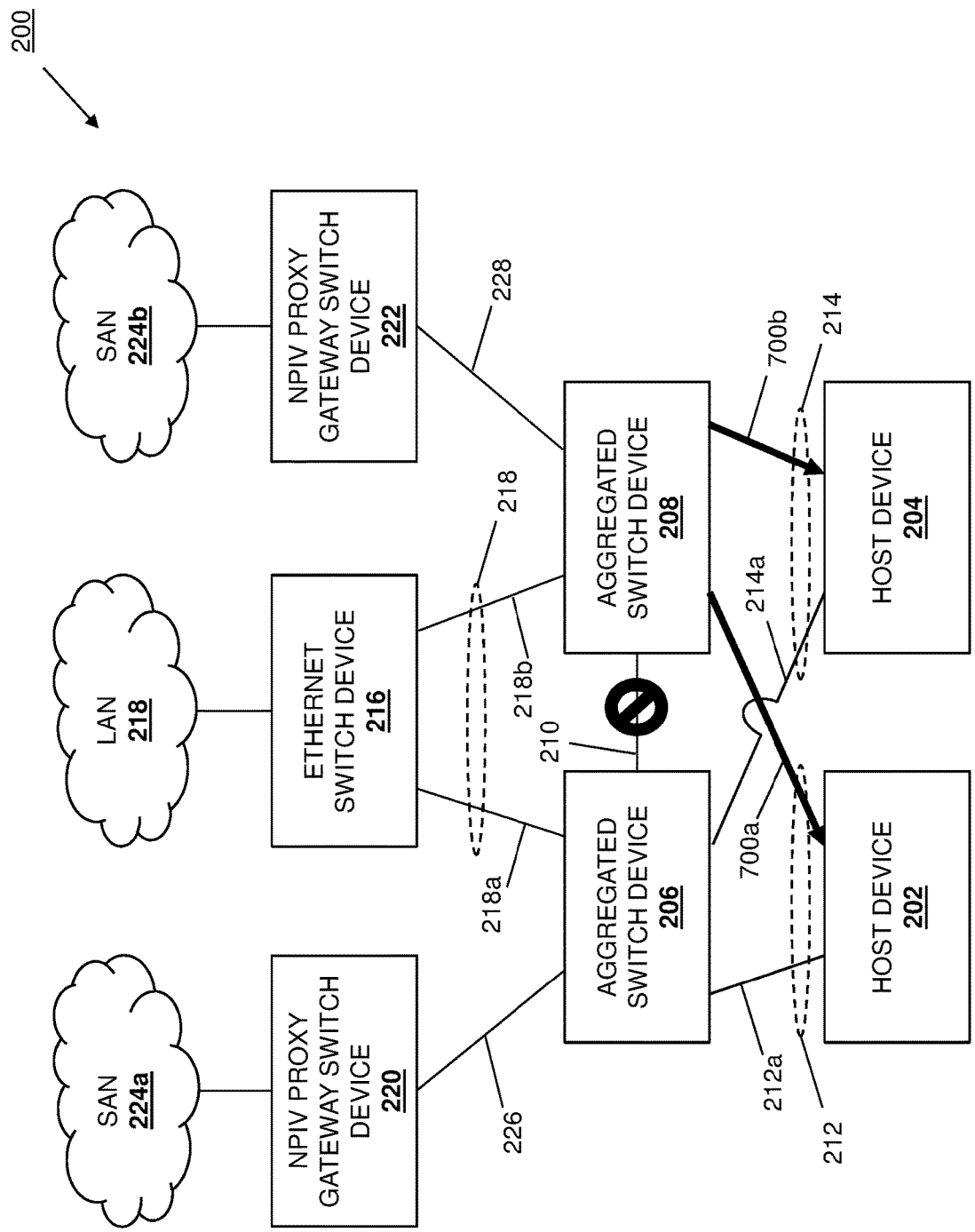
FIG. 7 is a schematic view illustrating an embodiment of the SAN access system of FIG. 2 operating during the method of FIG. 4.

In an embodiment, at block 408 and in response to determining that the ICL 210 has become unavailable (as illustrated in FIG. 6A), the SAN access engine 304 in the secondary aggregated switch device 208/300 may operate to transmit SAN-only traffic operation communications to the host devices 202 and 204. For example, FIG. 7 illustrates how the secondary aggregated switch device 208 may transmit SAN-only traffic operation communications 700a and 700b via the links 212b and 214b to the host devices 202 and 204, respectively. As will be appreciated by one of skill in the art in possession of the present disclosure, in some embodiments, the transmission of the SAN-only traffic operation communications 700a and 700b via the links 212b and 214b may be performed prior to the conventional aggregated switch domain operations discussed above that "bring down" or otherwise make unavailable those links 212b and 214b in response to the unavailability of the ICL 210.

As discussed below, the SAN-only traffic operation communications generated and transmitted by the secondary aggregated networking device at block 408 may be configured to indicate to the host devices 202 and 204 that they should begin performing the host device SAN access functionality of the present disclosure. As such, one of skill in the art in possession of the present disclosure will appreciate that host devices that are coupled to the aggregated switch devices 206 and 208 and that do not support the SAN access functionality of the present disclosure may not receive the SAN-only traffic operation communications discussed above at block 402. For example, in response to detecting the unavailability of the ICL 210, the SAN access engine 304 in the secondary aggregated switch device 208/300 may access its SAN access database 306 to identify the host device(s) that are connected to the secondary aggregated switch device 208/300 and that support the SAN access functionality of the present disclosure (e.g., via the SAN-only traffic support identifiers stored in the SAN access database 306 as discussed above), and thus may generate and transmit the SAN-only traffic operation communications to those host device(s). In a specific example, the SAN-only traffic operation communications generated and transmitted by the host devices at block 48 may be provided in TLV data structures. For example, the SAN-only traffic support communications generated and transmitted by the secondary aggregated switch device at block 408 may be provided using the DCBx TLV data structure discussed above, the example of which is reproduced below:

disclosure may be provided in a variety of manners that will fall within the scope of the present disclosure as well. As such, at block 408, the host devices 202 and 204 may receive the SAN-only traffic support communications 500a and 500b from the secondary aggregated switch device 208, and each of the host devices 202 and 204 may begin performing the SAN access functionality of the present disclosure. For example, in response to receiving the SAN-only traffic support communications 500a and 500b, the host devices 202 and 204 may configure their respective ports that provide the respective links 212b and 214b to the secondary aggregated switch device 208 as FCoE pinned ports for transmitting FCoE (storage) traffic to the secondary aggregated switch device 208. However, while a specific operation to provide the SAN access functionality of the present disclosure has been described, one of skill in the art in possession of the present disclosure will appreciate that the host devices 202 and 204 may perform a variety of operations (or may operate conventionally) in order to provide that SAN access functionality while remaining within the scope of the present disclosure as well.

Figure 8:
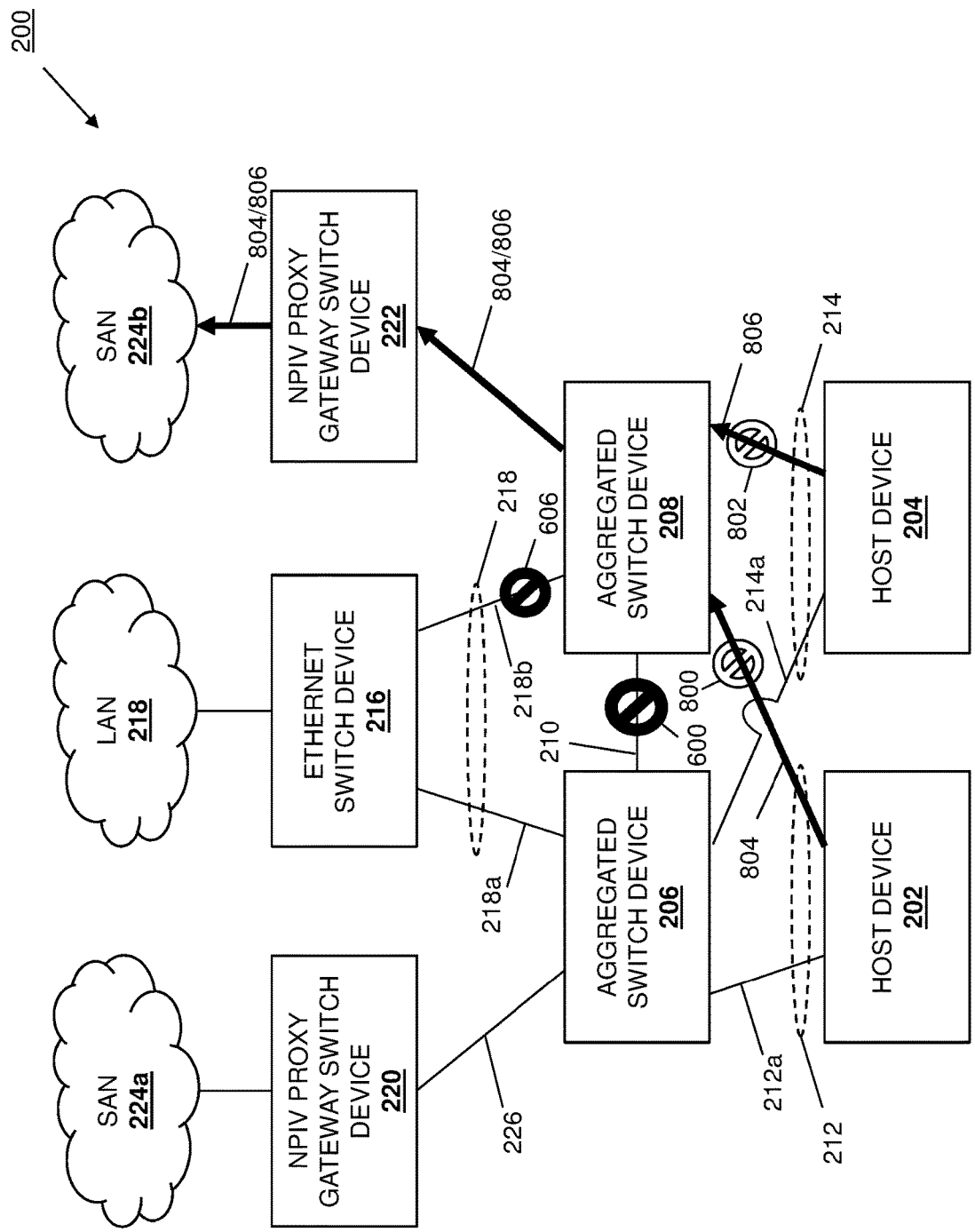
FIG. 8 is a schematic view illustrating an embodiment of the SAN access system of FIG. 2 operating during the method of FIG. 4.

The method 400 then proceeds to block 410 where the secondary aggregated switch device prevents transmission of IP traffic between the host device(s) and the LAN, and transmits storage traffic between the host device(s) and the SAN. With reference to FIG. 8 illustrating a situation in which the ICL 210 is unavailable while the link 226 is available, in an embodiment of block 410, the secondary aggregated switch device 208 may prevent the transmission of IP traffic between the host devices 202 and 204 and the LAN 218 by indicating to the host devices 202 and 204 that those links 212b and 214b are unavailable for IP traffic (as indicated by elements 800 and 802 in FIG. 8) and that the host devices 202 and 204 should not transmit any IP traffic via the links 212b and 214b, which one of skill in the art in possession of the present disclosure will recognize will stop the host devices 202 and 204 from transmitting IP traffic via those links 212b and 214b.

However, FIG. 8 also illustrates how the secondary aggregated switch device 208 may transmit storage traffic 804 and 806 from the host devices 202 and 204 and to the SAN 224b via the links 212b and 214b, which one of skill in the art in possession of the present disclosure will recognize may be enabled by the host devices 202 and 204 performing the SAN access functionality of the present disclosure (e.g., in response to receiving the SAN-only traffic support communications 500a and 500b as discussed above) to transmit

| TLV TYPE = 127 | TLV INFORMATION LENGTH = 6 | 802.1 OUI 00-80-C2 | 802.1 SUBTYPE = XX | WILLING (1 BIT) | RESERVED (7 BITS) | SAN-ONLY TRAFFIC SUPPORT FLAG (1 BIT) | USE LINK FOR SAN-ONLY FLAG (1 BIT) | RESERVED (6 BITS) |
|---|---|---|---|---|---|---|---|---|

As will be appreciated by one of skill in the art in possession of the present disclosure, the SAN-only traffic operation communications generated and transmitted by the secondary aggregated switch device at block 408 may be configured to indicate to the host devices 202 and 204 to begin performing the SAN access functionality of the present disclosure by setting the "USE LINK FOR SAN-ONLY FLAG" in the DCBx TLV data structure above. However, while a specific example of a SAN-only traffic operation communication has been described, one of skill in the art in possession of the present disclosure will appreciate that the SAN-only traffic operation communications of the present only storage traffic (and not IP traffic) to the secondary aggregated switch device 208 via the links 212b and 214b respectively. As such, one of skill in the art in possession of the present disclosure will recognize that the secondary aggregated switch device 208 may operate to receive that storage traffic via the links 212a and 214b, forward that storage traffic via the link 228 to the NPG switch device 222, while the NPG switch device 222 may operate to forward that storage traffic to the SAN 224b. Thus, in situations in which the ICL 210 is unavailable while the link 226 is available, storage traffic throughput in the SAN access system 200 is increased relatively to conventional systems due to the ability to transmit storage traffic via the secondary aggregated switch device 208 and over the link 228 to the SAN 224b (i.e., in addition to transmitting storage traffic via the primary aggregated switch device 206, over the link 226, to the NPG switch device 220, and to the SAN 224a.)

Figure 9:
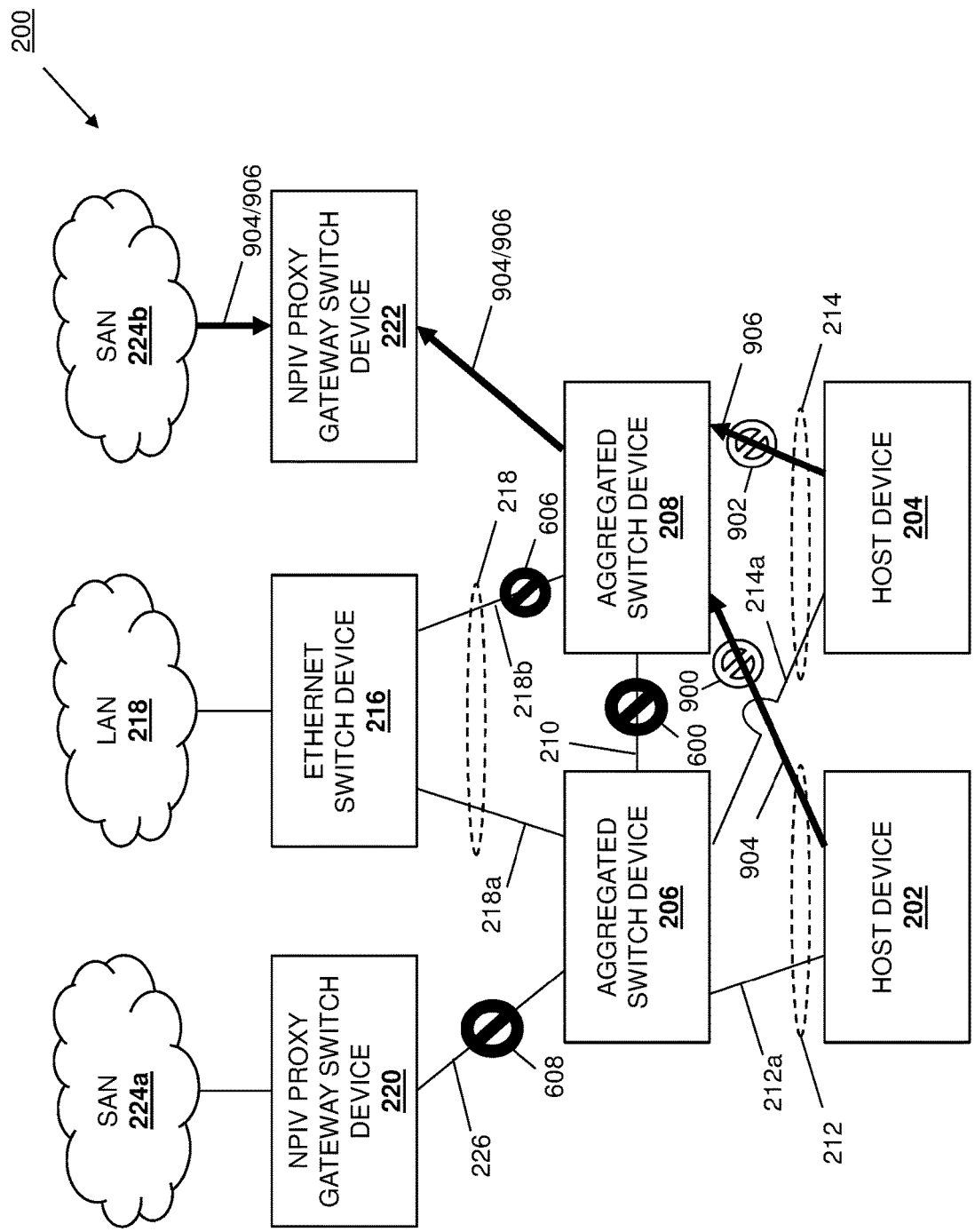
FIG. 9 is a schematic view illustrating an embodiment of the SAN access system of FIG. 2 operating during the method of FIG. 4.

With reference to FIG. 9 illustrating a situation in which the link 226 is unavailable while the ICL 210 is unavailable, in an embodiment of block 410, the secondary aggregated switch device 208 may prevent the transmission of IP traffic between the host devices 202 and 204 and the LAN 218 by indicating to the host devices 202 and 204 that those links 212b and 214b are unavailable for IP traffic (as indicated by elements 900 and 902 in FIG. 9) and that the host devices 202 and 204 should not transmit any IP traffic via the links 212b and 214b, which one of skill in the art in possession of the present disclosure will recognize will stop the host devices 202 and 204 from transmitting IP traffic via those links 212b and 214b.

However, FIG. 9 also illustrates how the secondary aggregated switch device 208 may transmit storage traffic 904 and 906 from the host devices 202 and 204 and to the SAN 224b via the links 212b and 214b, which one of skill in the art in possession of the present disclosure will recognize may be enabled by the host devices 202 and 204 performing the SAN access functionality of the present disclosure (e.g., in response to receiving the SAN-only traffic support communications 500a and 500b as discussed above) to transmit only storage traffic (and not IP traffic) to the secondary aggregated switch device 208 via the links 212b and 214b respectively. As such, one of skill in the art in possession of the present disclosure will recognize that the secondary aggregated switch device 208 may operate to receive that storage traffic via the links 212a and 214b, forward that storage traffic via the link 228 to the NPG switch device 222, while the NPG switch device 222 may operate to forward that storage traffic to the SAN 224b. Thus, in situations in which the link 226 is unavailable while the ICL 210 is unavailable, storage traffic to the SAN is enabled due to the ability to transmit storage traffic via the secondary aggregated switch device 208, over the link 228, to the NPG switch device 222, and to the SAN 224b (i.e., while the path provided via the primary aggregated switch device 206, over the link 226, to the NPG switch device 220, and to the SAN 224a is unavailable.)

The method 400 then proceeds to decision block 412 where it is determined whether an ICL between the secondary aggregated switch device and a primary aggregated switch device is available. In an embodiment, at decision block 412, the SAN access engine 304 in the secondary aggregated switch device 208/300 may operate to determine whether the ICL 210 between the primary aggregated switch device and the secondary aggregated switch device 208 has become available. As will be appreciated by one of skill in the art in possession of the present disclosure, ICLs that have failed, been "brought down", and/or otherwise become unavailable may subsequently recover, be "brought up", and/or otherwise may become available, and one of skill in the art in possession of the present disclosure will recognize how the SAN access engine 304 in the secondary aggregated switch device 208/300 may perform a variety of communications and/or other operations to monitor the ICL 210 for its availability in order to detect whether the ICL 210 has become available.

If, at decision block 412, it is determined that the ICL between the secondary aggregated switch device and the primary aggregated switch device is unavailable, the method 400 returns to block 410. As such, the method 400 may loop such that the second aggregated switch device 208 operates to prevent the transmission of IP traffic between the host devices 202 and 204 and the LAN 218, while transmitting the storage traffic between the host devices 202 and 204 and the SAN 224b, as long as the ICL 210 remains unavailable. If, at decision block 412, it is determined that the ICL between the secondary aggregated switch device and the primary aggregated switch device is available, the method 400 returns to block 404. As such, in the event the ICL 210 becomes available after some unavailability, the second aggregated switch device 208 may operate to transmit IP traffic between the host devices 202 and 204 and the LAN 218, while transmitting the storage traffic between the host devices 202 and 204 and the SAN 224b, as long as the ICL 210 remains available. As will be appreciated by one of skill in the art in possession of the present disclosure, the switch from preventing the transmission of IP traffic between the host devices 202 and 204 and the LAN 218, to then transmitting IP traffic between the host devices 202 and 204 and the LAN 218, may include a variety of operations such as, for example, the SAN access engine 304 in the secondary aggregated switch device 208/300 transmitting communications to the host devices 202 and 204 that indicate that the links 212b and 214b are once again available for IP traffic (i.e., in order to cause those host devices 202 and 204 to resume transmitting IP traffic to the aggregated switch device 208 via the links 212b and 214b, respectively.)

Thus, systems and methods have been described that provide for the transmission of storage traffic to a SAN via a secondary VLT switch device in the event that a VLTi with a primary VLT switch device become unavailable. As discussed above, in the event the VLTi become unavailable, conventional VLT switch device operation operates to "bring down" or otherwise make unavailable links from the secondary VLT switch device that are included in a VLT port channel with links from the primary VLT switch device in order to prevent the transmission of duplicate traffic. The systems and methods of the present disclosure modify such conventional operations by still preventing the transmission of IP traffic via the links from the secondary VLT switch device that are included in a VLT port channel with links from the primary VLT switch device in the event the VLTi becomes unavailable, while providing for the transmission of storage traffic over those links. As such, access for host devices to a SAN via the secondary VLT switch device does not become unavailable in the event the VLTi becomes unavailable, increasing storage traffic throughput in VLTi-unavailable situations, while access for host devices to the SAN is not completely cut off when the VLTi and the link from the primary VLT switch device to the SAN become unavailable.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Storage Area Network (SAN) access system, comprising:
    a Local Area Network (LAN);
    a Storage Area Network (SAN);
    a host device;
    a first aggregated switch device that is coupled to the host device, the LAN, and the SAN;

a second aggregated switch device that is coupled to the host device, the LAN, and the SAN, wherein the second aggregated switch device is connected to the first aggregated switch device via an Inter-Chassis Link (ICL) and configured to:
  detect that the ICL has become unavailable such that the first aggregated switch device and the second aggregated switch device cannot directly communicate;
  prevent, in response to detecting the ICL has become unavailable, Internet Protocol traffic between the host device and the LAN; and
  transmit, in response to detecting the ICL has become unavailable, storage traffic between the host device and the SAN.

2. The system of claim 1, wherein the second aggregated switch device is configured to:
  receive, from the host device, a SAN-only traffic support communication; and
  store a SAN-only traffic support identifier for the host device in a database, wherein the second aggregated switch device transmits the storage traffic between the host device and the SAN in response to detecting the unavailability of the ICL and based on the SAN-only traffic support identifier for the host device being stored in the database.

3. The system of claim 2, wherein the SAN-only traffic support communication is included in a Type-Length-Value (TLV) data structure.

4. The system of claim 1, wherein the second aggregated switch device is configured to:
  transmit, to the host device and in response to detecting the unavailability of the ICL, a SAN-only traffic operation communication that is configured to cause the host device to transmit the storage traffic to the second aggregated switch device for transmission to the SAN.

5. The system of claim 4, wherein the SAN-only traffic operation communication is included in a Type-Length-Value (TLV) data structure.

6. The system of claim 1, wherein the second aggregated switch device is configured to:
  detect that the ICL has become available; and
  transmit, in response to detecting the ICL has become available, Internet Protocol traffic between the host device and the LAN.

7. An Information Handling System (IHS), comprising:
  a processing system; and
  a memory system that is coupled to the processing system and that includes instructions that, when executed by the processing system, cause the processing system to provide a Storage Area Network (SAN) access engine that is configured to:
    detect that an Inter-Chassis Link (ICL) to an aggregated switch device has become unavailable such that processing system and the aggregated switch device cannot directly communicate;
    prevent, in response to detecting the ICL to the aggregated switch device has become unavailable, Internet Protocol traffic between a host device and a Local Area Network (LAN); and
    transmit, in response to detecting the ICL to the aggregated switch device has become unavailable, storage traffic between the host device and a Storage Area Network (SAN).

8. The IHS of claim 7, wherein the SAN access engine is configured to:
  receive, from the host device, a SAN-only traffic support communication; and
  store a SAN-only traffic support identifier for the host device in a database, wherein the SAN access engine transmits the storage traffic between the host device and the SAN in response to detecting the unavailability of the ICL and based on the SAN-only traffic support identifier for the host device being stored in the database.

9. The IHS of claim 8, wherein the SAN-only traffic support communication is included in a Type-Length-Value (TLV) data structure.

10. The IHS of claim 7, wherein the SAN access engine is configured to:
  transmit, to the host device and in response to detecting the unavailability of the ICL, a SAN-only traffic operation communication that is configured to cause the host device to transmit the storage traffic to the SAN access engine for transmission to the SAN.

11. The IHS of claim 10, wherein the SAN-only traffic operation communication is included in a Type-Length-Value (TLV) data structure.

12. The IHS of claim 7, wherein the SAN access engine is configured to:
  detect that the ICL has become available; and
  transmit, in response to detecting the ICL has become available, Internet Protocol traffic between the host device and the LAN.

13. The IHS of claim 7, wherein the SAN access engine transmits the storage traffic between the host device and the SAN on a first path that is different than a second path that is provided between the host device and the SAN by the aggregated networking device.

14. A method for accessing a Storage Area Network (SAN), comprising:
  detecting, by a first aggregated switch device, that an Inter-Chassis Link (ICL) to a second aggregated switch device has become unavailable such that the first aggregated switch device and the second aggregated switch device cannot directly communicate;
  preventing, by the first aggregated switch device in response to detecting the ICL to the second aggregated switch device has become unavailable, Internet Protocol traffic between a host device and a Local Area Network (LAN); and
  transmitting, by the first aggregated switch device in response to detecting the ICL to the second aggregated switch device has become unavailable, storage traffic between the host device and a Storage Area Network (SAN).

15. The method of claim 14, further comprising:
  receiving, by the first aggregated switch device from the host device, a SAN-only traffic support communication; and
  storing, by the first aggregated switch device, a SAN-only traffic support identifier for the host device in a database, wherein the first aggregated switch device transmits the storage traffic between the host device and the SAN in response to detecting the unavailability of the ICL and based on the SAN-only traffic support identifier for the host device being stored in the database.

16. The method of claim 15, wherein the SAN-only traffic support communication is included in a Type-Length-Value (TLV) data structure.

17. The method of claim 14, further comprising:
transmitting, by the first aggregated switch device to the host device and in response to detecting the unavailability of the ICL, a SAN-only traffic operation communication that is configured to cause the host device to transmit the storage traffic to the SAN access engine for transmission to the SAN.

18. The method of claim 17, wherein the SAN-only traffic operation communication is included in a Type-Length-Value (TLV) data structure.

19. The method of claim 14, further comprising:
detecting, by first aggregated switch device, that the ICL has become available; and
transmitting, by the first aggregated switch device in response to detecting the ICL has become available, Internet Protocol traffic between the host device and the LAN.

20. The method of claim 14, wherein the first aggregated switch device transmits the storage traffic between the host device and the SAN on a first path that is different than a second path that is provided between the host device and the SAN by the second aggregated networking device.

\* \* \* \* \*